(12) United States Patent
Kim et al.

(10) Patent No.: US 7,646,784 B2
(45) Date of Patent: Jan. 12, 2010

(54) APPARATUS FOR ESTIMATING FREQUENCY OFFSET FROM RECEIVED SIGNAL AND METHOD FOR THE SAME

(75) Inventors: Pansoo Kim, Daejon (KR); Yun-Jeong Song, Daejon (KR); Soon-Ik Jeon, Daejon (KR); Deock-Gil Oh, Daejon (KR); Ho-Jin Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 550 days.

(21) Appl. No.: 11/026,957

(22) Filed: Dec. 30, 2004

(65) Prior Publication Data

US 2006/0045137 A1      Mar. 2, 2006

(30) Foreign Application Priority Data

Sep. 2, 2004      (KR) ............... 10-2004-0070010

(51) Int. Cl.
  *H04J 4/00* (2006.01)
  *H04J 3/16* (2006.01)
  *H04J 3/06* (2006.01)
  *H04B 1/00* (2006.01)
  *H03K 9/10* (2006.01)
  *H04L 7/04* (2006.01)

(52) U.S. Cl. ............... 370/436; 370/437; 370/516; 370/517; 370/519; 375/149; 375/362; 375/323

(58) Field of Classification Search ............ 370/516, 370/517, 519, 436, 437; 375/149, 362, 323
See application file for complete search history.

(56) References Cited

U.S. PATENT DOCUMENTS 5,280,473 A * 1/1994 Rushing et al. ............ 370/289
5,898,744 A * 4/1999 Kimbrow et al. ........... 375/376

6,088,406 A * 7/2000 Suzuki ..................... 375/343

(Continued)

FOREIGN PATENT DOCUMENTS

JP      2001-024727      1/2001

(Continued)

OTHER PUBLICATIONS

"Data-Aided Frequency Estimation for Burst Digital Transmission", U. Mengali, et al., IEEE Transaction on Communications, vol. 45, No. 1, Jan. 1997; pp. 23-25.

(Continued)

*Primary Examiner*—Chi H Pham
*Assistant Examiner*—Farah Faroul
(74) *Attorney, Agent, or Firm*—Blakely, Sokoloff, Taylor & Zafman (57) ABSTRACT

Provided are an apparatus for estimating frequency offset from received signal and method for the same. The apparatus and method estimates frequency offset precisely without increment of autocorrelator by performing moving average filtering on a noised signal to thereby alleviate jitter. The frequency offset estimating apparatus includes: moving average filter for alleviating jitter of received signal; multiplier for multiplying a filtered signal by conjugate complex operanded pilot signal; phase-rotation value calculator for calculating a phase-rotation value from multiplicand operanded signal by using of symbol delay and an autocorrelation function; frequency offset estimator for estimating frequency offset from the phase-rotation value based on a smoothing function multiplication.

10 Claims, 7 Drawing Sheets

U.S. PATENT DOCUMENTS

| | | |
|---|---|---|
| 6,134,286 A | 10/2000 | Chennakeshu |
| 6,577,690 B1 * | 6/2003 | Barman et al. ............... 375/354 |
| 6,590,941 B2 | 7/2003 | Legrand |
| 6,603,821 B1 * | 8/2003 | Doi ............................ 375/326 |
| 7,167,456 B2 * | 1/2007 | Iwamatsu et al. ........... 370/321 |
| 2003/0087620 A1 * | 5/2003 | Sendonais .................... 455/266 |
| 2003/0142764 A1 * | 7/2003 | Keevill et al. ................ 375/341 |
| 2003/0206559 A1 * | 11/2003 | Trachewsky et al. ......... 370/509 |
| 2004/0207763 A1 * | 10/2004 | Ciardi ......................... 348/723 |

FOREIGN PATENT DOCUMENTS

| | | |
|---|---|---|
| KR | 102002002096 A | 3/2002 |
| KR | 102002006840 A | 8/2002 |
| KR | 102003005954 A | 7/2003 |
| KR | 102005004347 A | 5/2005 |

OTHER PUBLICATIONS

"A Ka-band Mobile Broadband Satellite Internet Access System Development"; H. Lee, et al., IST Mobile & Wireless Communications; Summit 2004; Lyon, France Jun. 27-30, 6 pages.

Fitz, Michael. P., "Planar Filtered Techniques for Burst Mode Carrier Synchronization," *IEEE Globecom* 1991, Phoenix, Arizona, pp. 0356-0369.

Luise, Marco, et al., "Carrier Frequency Recovery in All-Digital Modems for Burst Mode Transmissions," IEEE Transactions on Communications, vol. 43, No. 2/3/4, Feb./Mar./Apr. 1995, pp. 1169-1178.

* cited by examiner

APPARATUS FOR ESTIMATING FREQUENCY OFFSET FROM RECEIVED SIGNAL AND METHOD FOR THE SAME

FIELD OF THE INVENTION

The present invention relates to a mobile broadcast interactive satellite multimedia access technology; and, more particularly, to an apparatus and a method for estimating the carrier frequency offsets between transmitted (Tx) signal and Received (Rx) signal in Time division multiple access (TDMA) system.

DESCRIPTION OF RELATED ART

In general, a receiving terminal of a wired/wireless communication system performs a process of reproducing the original signal after a received RF signal through a radio frequency (RF) module and an intermediate frequency (IF) module. In this procedure, the RF signal is down converted into a baseband signal based on a reference frequency created by an analog local oscillator.

Nonetheless, since distortion occurs in the process of converting the RF signal to the baseband signal, it is impossible to perform normal recovery of the carrier frequency due to the imperfection of the analog local oscillator.

Furthermore, if the receiving terminal would be on move, the carrier frequency of the receiving RF signal would be shifted due to the Doppler effect and thus the original signal cannot be recovered normally.

A burst modem based on a TDMA uses feedforward frequency estimation circuit to estimate the offset of the carrier frequency and Doppler frequency. Herein, due to a problem of initial capture time for frequency offset, the feedforward frequency estimation circuit is used instead of a feedbackward frequency estimation circuit.

For example, a frequency estimating method autocorrelator using and an arc tangent lookup table is disclosed in an article entitled "Data-Aided Freq. Estimation for Burst Digital Transmission", by U. Mengali and M. Morelli (hereinafter which will be referred to as M&M) IEEE Trans. Commun. Vol. 45, No. 1 January 1997.

Also, a frequency estimating method using a similar autocorrelator to 'M&M' is disclosed in an article entitled "Planna filtered techniques for burst mode carrier synchronization" (which will be referred to as Fitz), by IEEE Glebecom '91, Phoenix, Ariz. M. P. Fitz, December 1991 and in an article entitled "Carrier Frequency Recovery in All Digital Modems for Burst Mode Transmission" by M. Luise and R. Reggiannini (which will be referred to as L&R), IEEE Trans. Commun. Vol. 43, No. 3 March 1995.

Generally, frequency offset lock range normalized to symbol rate, should be about 0.1 to remove the noise of transmitted (Tx) signal by matched filter, but the 'Fitz' and 'L&R' cannot satisfy this requirement.

Furthermore, the frequency offset estimating method suggested by the 'M&M', 'Fitz' and 'L&R', can make nearly perfect estimation by using an autocorrelator which is half as long as a half length of Data-Aided symbol. However, the autocorrelator has a problem that it increases the number of multipliers and memories to hereby increase the complexity.

Therefore, it is required that a frequency offset estimation apparatus is developed to perform accurate frequency offset estimation with a simple hardware structure.

SUMMARY OF THE INVENTION

It is, therefore, an object of the present invention to provide an apparatus and a method for estimating the frequency offset through a received (Rx) signal in TDMA system. An apparatus for estimating a frequency offset from a received (Rx) signal, comprising: a filter for alleviating a jitter of received signal thereby obtaining a filtered signal; a multiplier for multiplying the filtering signal by a complex conjugate pilot signal thereby obtaining a multiplied signal; a phase-rotation value calculator for calculating a phase-rotation value from the multiplied signal by using a symbol delay and an autocorrelation function; and a frequency offset estimator for estimating the frequency offset based on the phase-rotation value through a multiplication of a smoothing function.

A method for estimating a frequency offset from a received signal, comprising the steps of: filtering a jitter by moving average filtering on the received signal; multiplying the filtered signal by complex a conjugate pilot signal; calculating a phase rotation value from the multiplied signal by using a symbol delay and an autocorrelation; and estimating the frequency offset by multiplying the calculated phase rotation value with a smoothing function.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereafter, preferred embodiments of the present invention will be described in detail with reference to the drawings.

Figure 1:
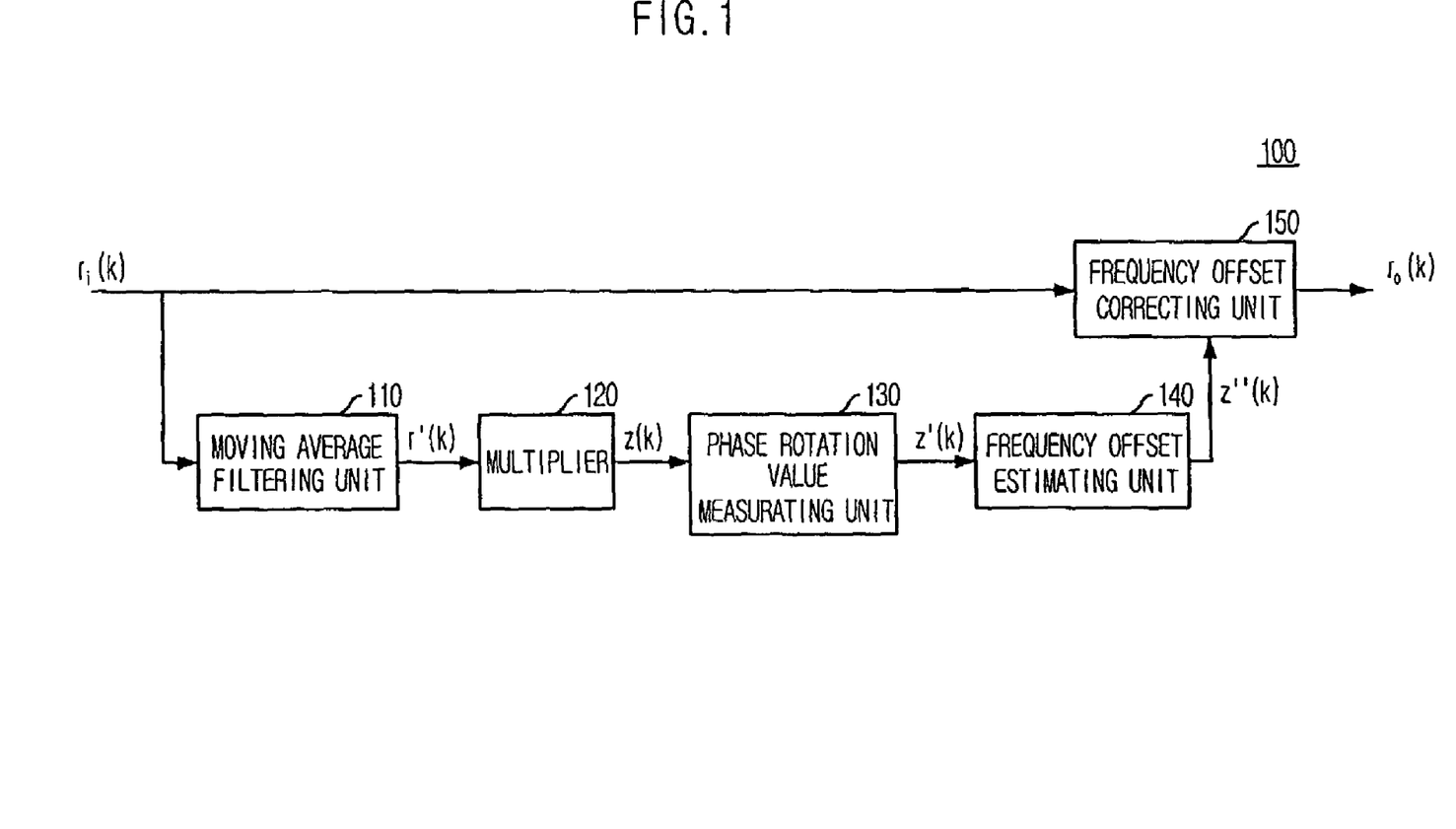
FIG. 1 is a block diagram showing an apparatus for estimating a frequency offset from an in accordance with one embodiment of the present invention.

FIG. 1 is a block diagram showing an apparatus estimating a frequency offset from an in accordance with one embodiment of the present invention;

As shown, the apparatus include a moving average filtering unit 110, a multiplier 120, a phase rotation measuring unit 130, a frequency offset estimating unit 140 and a frequency offset correcting unit 150.

The moving average filtering unit 110 receives a received signal ri(k) including a noise and alleviates the jitter of the received signal ri(k). Namely, the moving average filtering unit 110 enhances the accuracy of frequency offset estimation without increasing the number of autocorrelators by decreasing the distribution of the noise added received signal ri(k).

The multiplier 120 multiplies a filtered signal by a complex conjugate pilot signal, and the phase rotation measuring unit 130 measures a phase rotation value between a preceding symbol and a current symbol by using a symbol delay and an autocorrelation function.

The frequency offset estimating unit 140 estimates a frequency offset by using the measured phase rotation value and a smoothing function. The frequency offset correcting unit 150 corrects the frequency offset of the received signal by multiplying the noise added received signal by the estimated frequency offset, thereby outputting an output signal ro(k)

Figure 2:
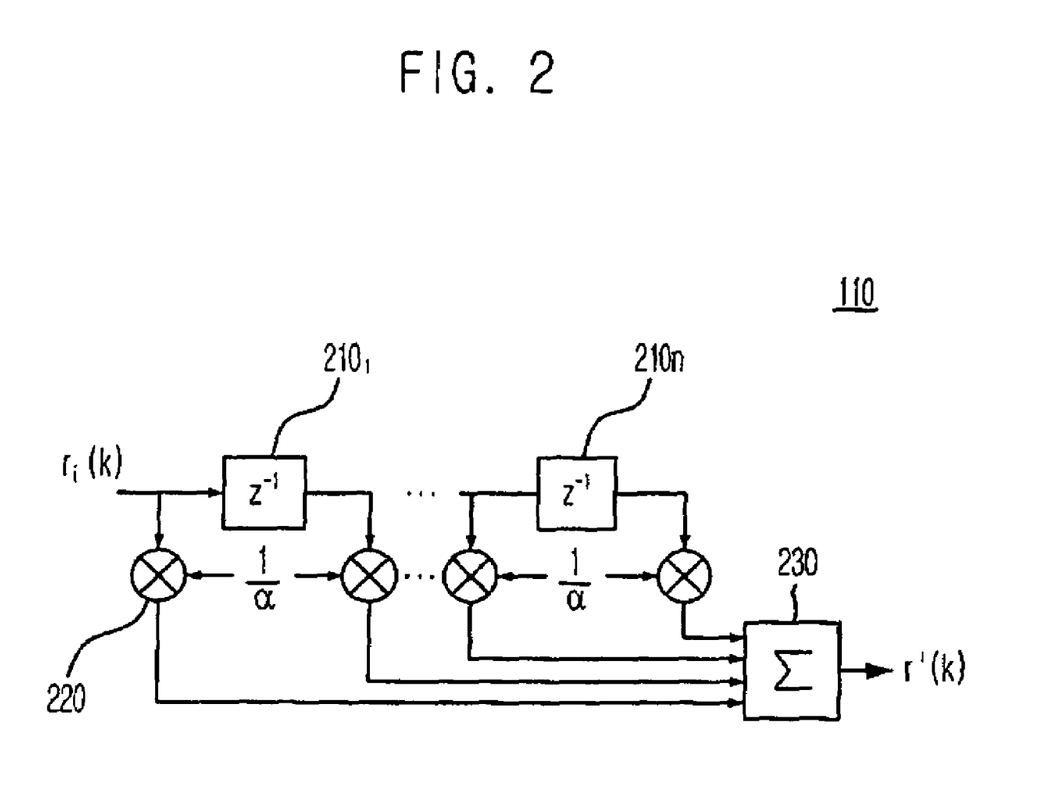
FIG. 2 is a detailed schematic diagram describing a moving average filtering unit of FIG. 1.
Figure 3:
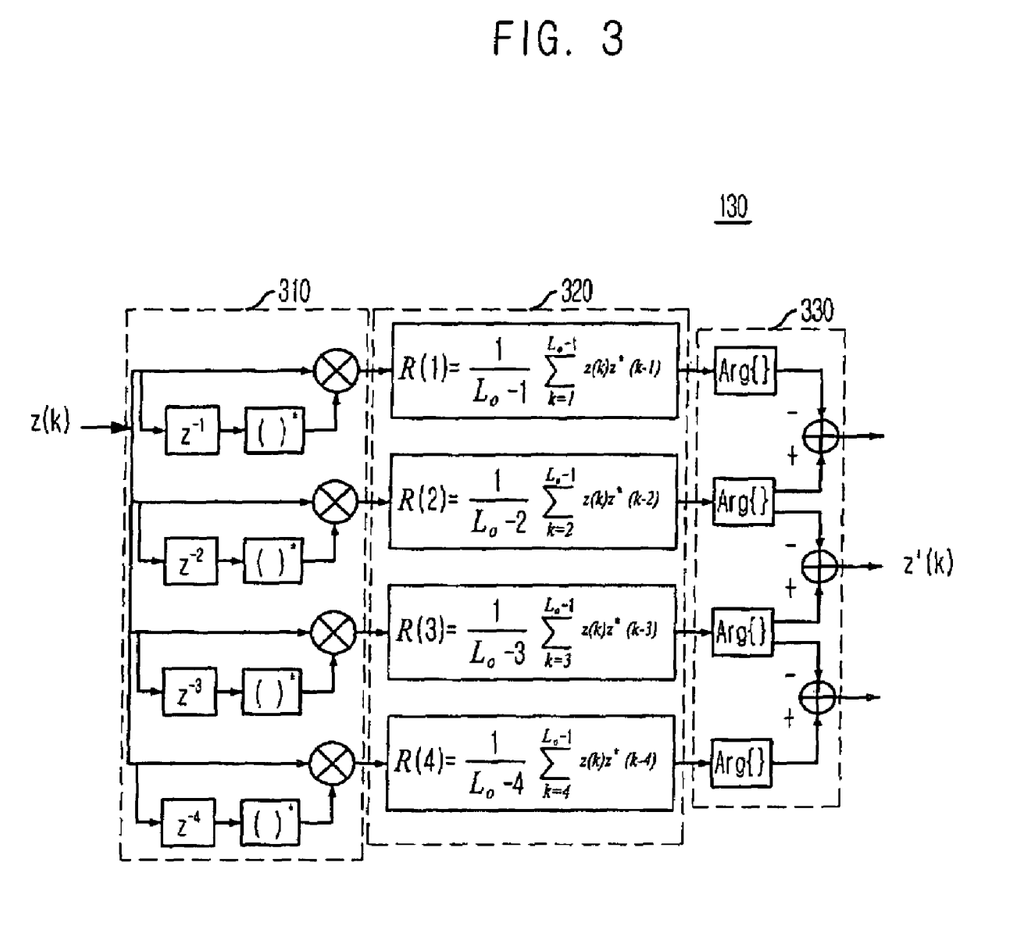
FIG. 3 is a detailed schematic diagram describing a phase rotation measuring unit of FIG. 1.
Figure 4:
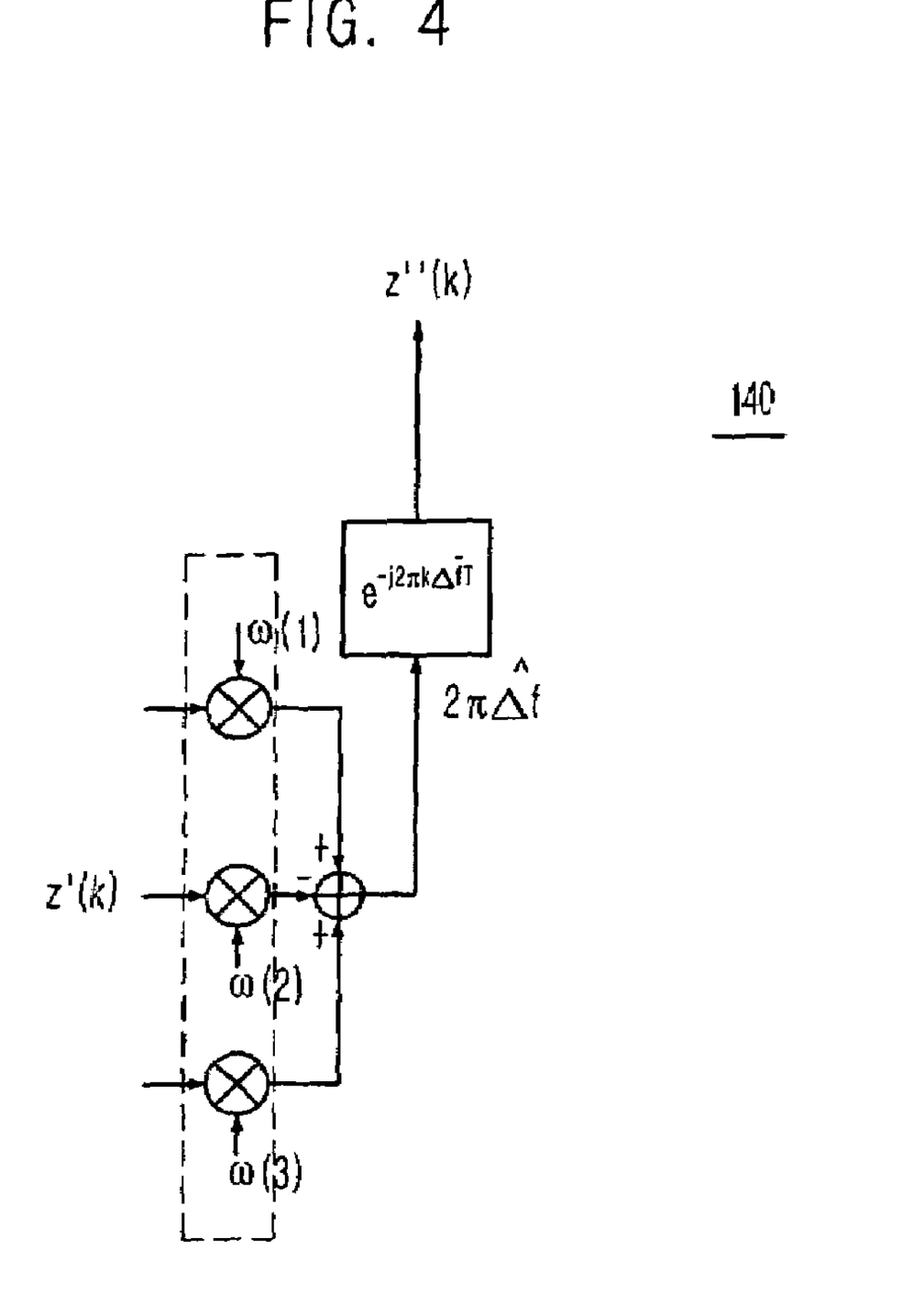
FIG. 4 is a detailed schematic diagram describing a frequency offset estimating unit of FIG. 1.

FIG. 2 is a detailed diagram describing a moving average filtering unit 1; FIG. 3 is a detailed diagram describing phase rotation measuring unit and FIG. 4 is a detailed schematic describing a frequency offset estimating unit of FIG. 1.

The moving average filtering unit 110 includes a plurality of delay taps 210, a plurality of multiplier 220, and a summing block 230.

In the drawing, 'α' denotes the number of delay taps 210, '1/α' means a filter coefficient as a weight value, and the initial delay tap is set to '0'. At a random point, when a received signal ri(k) is putted into the moving average filtering unit 110, it is stored in a first delay tap 210 and coincidentally transmitted for an output of the moving average filtering unit 110. The received signal ri(k) is expressed as the following equation 1.

$$r(k) = c_k \cdot e^{j(2\pi f_d kT + \theta)} + n(k) \qquad \text{Eq. 1}$$

Wherein, k means a symbol/sample unit that activated by 1 sample per symbol; Ck means a predetermined pilot signal; n(k) means a noise signal; fd means a frequency offset; and θ means a phase rotation value.

The signal stored in the first delay tap 2101, is transmitted to a second delay tap 2102 and it is transmitted coincidentally for the moving average filtering unit 110. The transmission process is performed serially, and the last delay tap signal is transmitted for the output of the moving average filtering unit 110. Herein, the signal, transmitted for the output of moving average filtering unit 110, is multiplied by the filter coefficient '1/α' in the multiplier 220, and a multiplied signal is outputted and add up to one signal as Equation 2 by summer 230.

$$r'(k) = \frac{1}{\alpha} \sum_{m=0}^{\alpha-1} r(m) \qquad \text{Eq. 2}$$

The multiplier 120 multiplies the filtered signal r'(k) by complex conjugate pilot signal (C*k) and executes the operation based on Equation 3 thereby obtaining a multiplied signal z(k). Here, the pattern of complex conjugate pilot signal is 1, 1, 1 . . . .

$$z(k) = e^{j(2\pi f_d kT + \theta)} + n(k) C^*_k \qquad \text{Eq. 3}$$

The phase rotation measuring unit 130 includes a symbol delay unit 310, an autocorrelation calculating unit 320, and a phase rotation value calculating unit 330.

In detail, after the multiplied signal z(k) is d-symbol delayed in the symbol delay unit 310, the complex conjugate operation is executed. And, the delayed and complex conjugated signal z*(k−d) is multiplied by the multiplied signal z(k). Thereafter, the autocorrelation calculating unit 320 calculates an autocorrelation coefficient R(d) by using the operated signal z(k)z*(k−d) based on equation 4.

$$R(d) = \frac{1}{L_0 - d} \sum_{k=d}^{L_0-1} z(k) z^*(k-d), \quad 1 \le d \le N, \quad N \le \frac{L_0}{2} \qquad \text{Eq. 4}$$

Wherein, R(d) is a calculating result of phase rotation value from symbol of d point to L0−1 symbol and L0 is a estimation length of symbol and the number of autocorrelator included in the autocorrelation calculating unit 320 can be extended up to N, where N is a positive number. Herein, the multiply operand coefficient is N(2L0−N−1)/2.

The phase rotation value calculating unit 330 calculates phase rotation value between a previous symbol and a present symbol by calculating an argument of the autocorrelation coefficient.

$$\phi = [\arg R(d) - \arg R(d-1)]_{2\pi} \qquad \text{Eq. 5}$$

Subsequently, the frequency offset estimating unit 140 multiplies the phase rotation value by a coefficient w(d) defined by Equation 6. Herein, the coefficient defined in Equation 6 is a value of a smoothing function decided by the number of delay symbols 'd' of the symbol delay unit 310.

$$\omega(d) \triangleq \frac{3[(L_0 - d)(L_0 - d + 1) - N(L_0 - N)]}{N(4N^2 - 6NL_0 + 3L_0^2 - 1)} \qquad \text{Eq. 6}$$

$$\hat{f}_d T = \frac{1}{2\pi} \sum_{d=1}^{N} \omega(d) \times [\arg\{R(d)\} - \arg\{R(d-1)\}]_{2\pi} \qquad \text{Eq. 7}$$

Because the argument operated phase rotation value and the phase offset estimation value are not linear, the argument operated phase rotation value and the frequency offset are lineared by performing the normalization with multiplying the coefficient defined in Equation 6.

Subsequently, the frequency offset correcting unit 150 corrects the frequency offset of received signal by multiplying the frequency offset estimation value by the received signal expressed in Equation 1.

Figure 5:
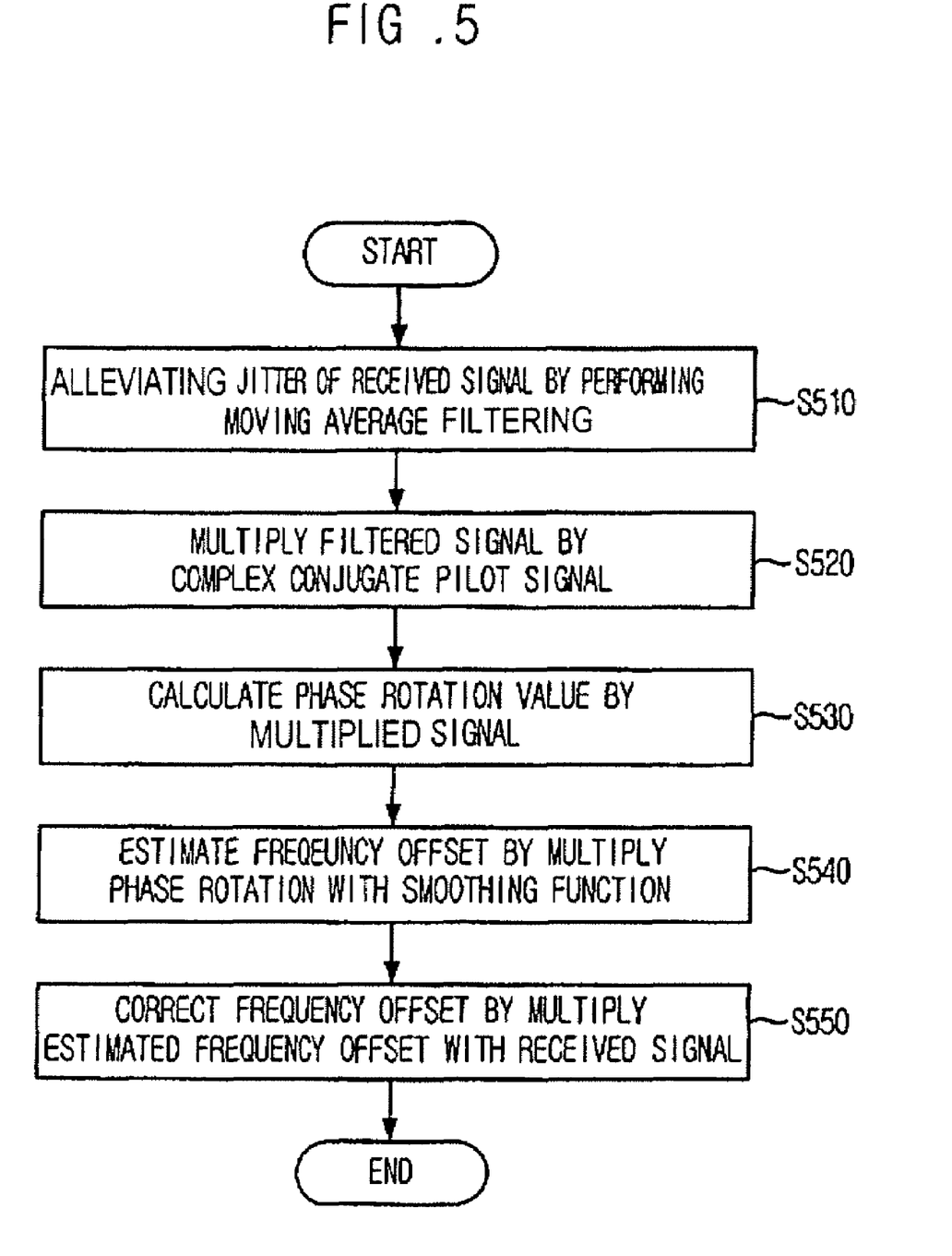
FIG. 5 is a flowchart illustrating a method for estimating a frequency offset from a received signal in accordance with another embodiment of the present invention.

FIG. 5 is a flowchart illustrating a method for estimating a frequency offset from a received signal in accordance another preferred embodiment of the present invention.

As shown, first, the moving average filtering of noised received signal alleviates the jitter.

Subsequently, at step s520, the filtered signal is multiplied by complex conjugate pilot signal. Then at step s530, a phase rotation value is calculated from multiplied signal by using the symbol delay and autocorrelation.

Then, at step s540, the frequency offset is calculated by multiplying the calculated phase rotation value by smoothing function. Then at step s550, frequency offset is corrected by multiplying estimated frequency offset by formal received signal.

Figure 6:
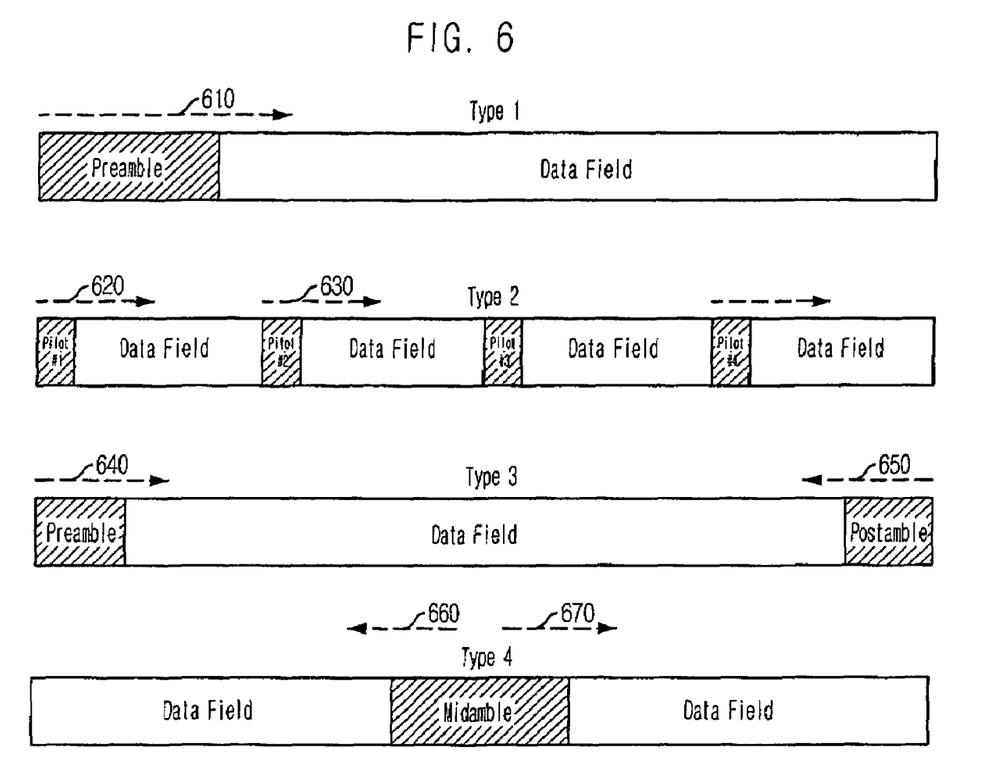
FIG. 6 is a diagram illustrating a burst transmission structure for the frequency estimation method in accordance with the present invention.

FIG. 6 is a diagram illustrating a burst transmission structure for the frequency offset estimation method in accordance with one preferred embodiment of the present invention.

As shown, a type 1 burst transmitting structure includes a preamble and a data field. The apparatus for estimating a frequency offset from a received signal of the present invention, estimates frequency offset in preamble of received burst, corrects frequency offset of the proper data field in the direction of reference numeral 610.

Furthermore, the burst transmitting structure of a type 2 is a distributed pilot structure that a pilot and a data field is separated. As shown, the apparatus for estimating a frequency estimates the frequency offset in pilot #1. Then corrects frequency offset of the forepart data field in pilot #2 in the direction of a reference numeral 620.

Also, a frequency offset in pilot #2 is corrected, corrects frequency offset of the forepart data field in pilot #3 is corrected in the direction of reference numeral 630.

The burst transmit structure of a type 3 includes a preamble, data field and a postamble. The apparatus for estimating a frequency offset simultaneously corrects the frequency offset of the data field in the direction of reference numerals 640, 650.

Moreover, the burst transmitting a data field of type 4 includes a data field, a midamble and a data field, and the apparatus for estimating a frequency offset of the present invention corrects the frequency offset of the data field in the direction of reference numerals 660 and 670 by frequency estimating of each preamble and postamble.

Figure 7:
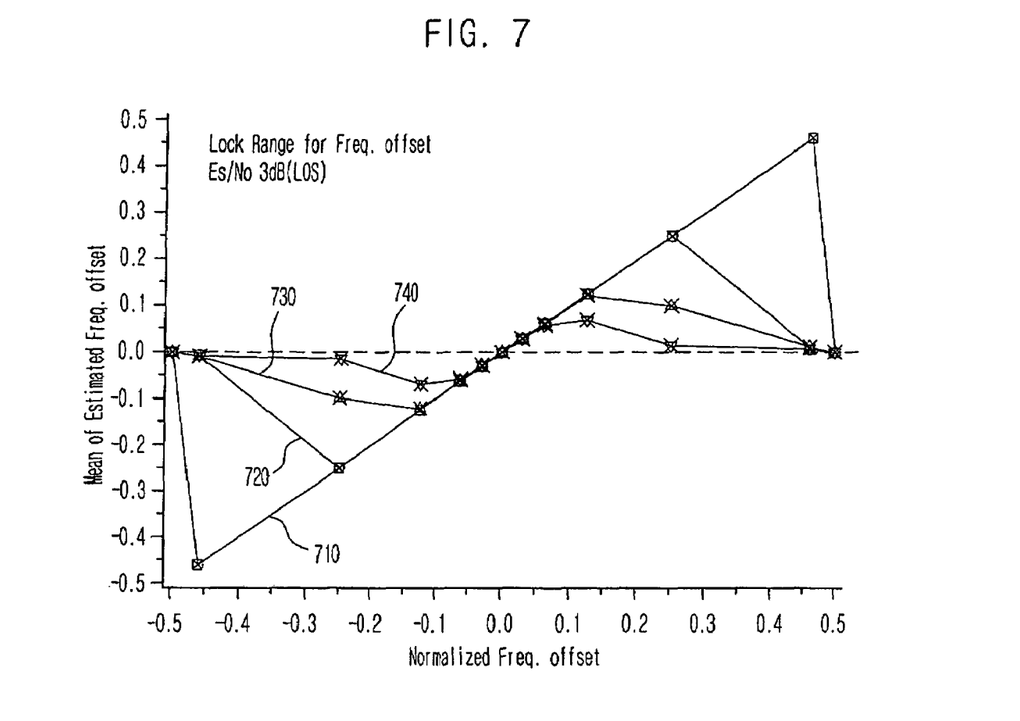
FIG. 7 is a graph showing a frequency offset capture area of the frequency estimating apparatus in accordance with the present invention.

FIG. 7 is a graph showing a frequency offset capture area of the apparatus for estimating a frequency offset in accordance with one preferred embodiment of the present invention.

Referring to FIG. 7, a reference numeral 710 showing a frequency offset capture area of existing frequency offset estimating method, reference numerals 720, 730 and 740 showing the frequency offset capture area of the present invention each having 2, 6, 10 taps in a moving average filter. The abscissa axis of FIG. 7 is a frequency offset that normalized to symbol rate, and the ordinate axis is an average value of frequency offset by frequency offset estimating apparatus.

As shown, the frequency offset lock range of reference numeral 710 is about 0.4. The more taps the moving average filter has, the narrower the offset lock range of the apparatus for estimating a frequency offset 720 and 730, 740 each having 2, 6, 10 taps become. For example, if the number of the taps of the moving average filter is 10, the frequency offset lock range of the apparatus for estimating a frequency offset is about 0.05. As the number of moving average filter is increased, the accuracy of apparatus for estimating a frequency offset is increased but the frequency offset lock range is decreased.

Figure 8:
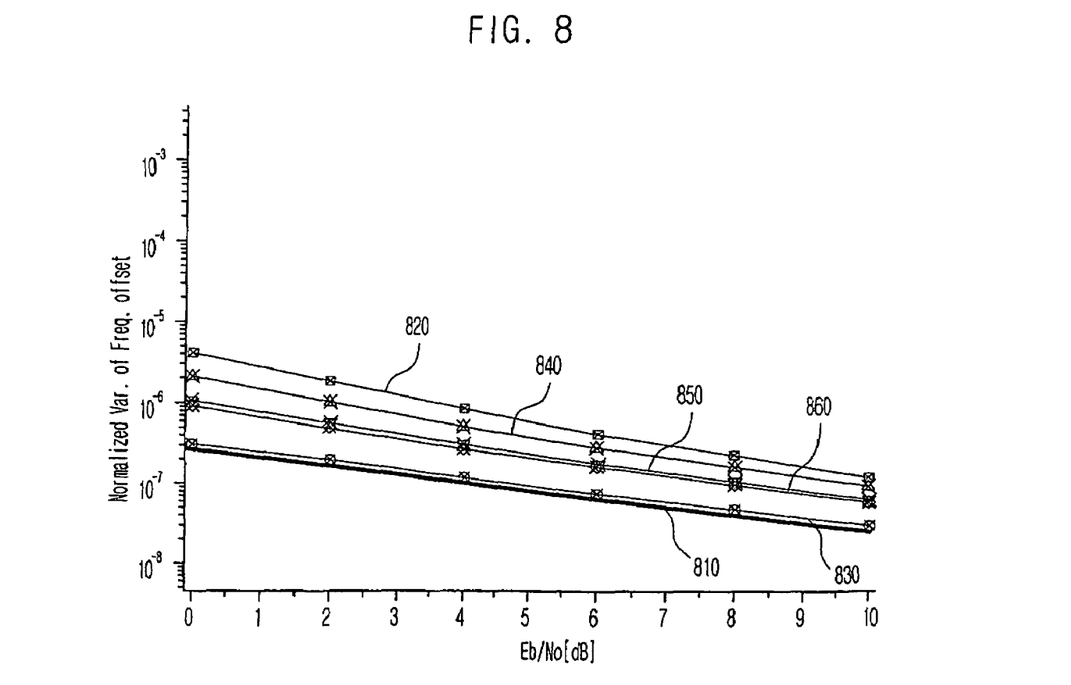
FIG. 8 is a graph showing the accuracy of the frequency estimating apparatus in accordance with the present invention.

FIG. 8 is a graph showing the accuracy of the apparatus for estimating a frequency offset in accordance with one preferred embodiment of the present invention.

The abscissa axis is a Eb/No, the ordinate axis is a normalized variance of the frequency offset. The burst transmitting structure of preferred embodiment is a type 1 of FIG. 4, and the length of the preamble is 64.

The reference numeral 810 illustrated in FIG. 8 is a marginal value of frequency offset variance theoretically, and the reference numerals 820 and 830 are frequency offset distribution of the conventional frequency offset estimating method of having 4 and 32, autocorrelators, and the reference numerals 840, 850 and 860 are a frequency offset distribution of the frequency offset estimating having autocorrelators and having 2, 6 and 10 taps in present invention.

As shown, if the number of autocorrelators is 32, the conventional method has a frequency offset distributing value that is close to a theoretic value. However it has a problem complexity in calculation and hardware that is increased, if the number of autocorrelators is 4, the complexity in calculation and hardware is decreased, but here is a problem that the performance is lower than the theoretic value.

However, the apparatus for estimating a frequency offset 840, 850 and 860, having autocorrelators, which is suggested in present invention, can acquire a value close to the offset variance value as the number of moving average filter is increased. That is, the apparatus for estimating a frequency offset of the present invention, shows performance approximated theoretic value without increasing the complexity of calculation and hardware, by not increasing the number of autocorrelators and by using the moving average filter.

The present application contains subject matter related to Korean patent application no. 2003-79003, filed in the Korean Patent Office on Nov. 10, 2003, the entire contents of which being incorporated herein by reference.

While the present invention has been described with respect to certain preferred embodiments, it will be apparent to those skilled in the art that various changes and modifications may be made without departing from the scope of the invention.

What is claimed is:

1. An apparatus for estimating a frequency offset from a received signal, comprising:
    a moving average filter for alleviating a jitter of received signal thereby obtaining a filtered signal, the moving average filter including a plurality of delay taps based on a frequency offset estimating range;
    a multiplier for multiplying the filtered signal by a complex conjugate pilot signal thereby obtaining a multiplied signal;
    a phase-rotation value calculator for calculating a phase-rotation value from the multiplied signal by using a symbol delay and an autocorrelation function, wherein the phase-rotation value is calculated after multiplying the filtered signal by the complex conjugate pilot signal; and
    a frequency offset estimator for estimating the frequency offset based on the phase-rotation value through a multiplication of a smoothing function.

2. The apparatus as recited in claim 1,
    further includes a frequency offset correction means for correcting,
    a frequency offset by multiplying the received signal and the estimated frequency offset.

3. The apparatus as recited in claim 1, wherein the moving average filter includes:
    wherein the jitter of the received signal is alleviated by processing the received signal based on an equation expressed as:

$$r(k) = \frac{1}{\alpha} \sum_{m=0}^{\alpha-1} r(m)$$

wherein r(m) is a received signal and α is the number of the delay taps.

4. The apparatus as recited in claim 3,
    wherein the phase rotation value calculator executes the symbol delay and an autocorrelation based on the number of the delay taps.

5. A method for estimating a frequency offset from a received signal, comprising the steps of:
    (a) filtering a jitter by moving average filtering on the received signal to obtain a filtered signal, wherein the moving average filtering includes:
        a1) sequentially delaying the received signal based on a plurality of delay taps;
    (b) multiplying the filtered signal by a complex conjugate pilot signal to obtain a multiplied signal;

(c) calculating a phase rotation value from the multiplied signal by using a symbol delay and an autocorrelation, wherein the phase-rotation value is calculated after multiplying the filtered signal by the complex conjugate pilot signal; and (d) estimating the frequency offset by multiplying the calculated phase rotation value with a smoothing function.

6. The method as recited in claim 5, further comprising a step of:

correcting the frequency offset by multiplying the received signal with the estimated frequency offset.

7. The method as recited in claim 5, wherein the step a) further includes the steps of:

a2) multiplying the received signal and the delayed signal by a weight value; and a3) adding the weight value multiplied signals.

8. The method is recited in claim 6, wherein the step a) further includes the steps of:

a2) multiplying the received signal and the delayed signal by a weight value; and a3) adding the weight value multiplied signals.

9. The method as recited in claim 7, wherein the weight is an inverse number of the number of the delay taps.

10. The method is recited in claim 8, wherein the weight is an inverse number of the number of the delay taps.

* * * * *